United States Patent [19]

Cuneo

[11] 4,381,037

[45] Apr. 26, 1983

[54] PORTABLE ELECTRIC TOOL

[75] Inventor: Giuseppe Cuneo, Calolziocorte, Italy

[73] Assignee: Black & Decker Inc., Newark, Del.

[21] Appl. No.: 201,553

[22] Filed: Oct. 28, 1980

[30] Foreign Application Priority Data

Oct. 29, 1979 [IT] Italy ............................. 22984/79[U]

[51] Int. Cl.³ ....................... B23D 45/00; B25D 17/00
[52] U.S. Cl. ................................... 173/170; 200/157;
200/321; 200/334; 408/710
[58] Field of Search ................... 173/170; 83/DIG. 1;
408/710; 200/157, 321, 334

[56] References Cited

U.S. PATENT DOCUMENTS

| | | | |
|---|---|---|---|
| 935,634 | 10/1909 | Baxter | 173/170 |
| 991,431 | 5/1911 | Duntley | 200/157 |
| 2,263,136 | 11/1941 | Knouse | 200/157 |
| 2,842,788 | 7/1958 | Rench | 200/157 |
| 3,131,277 | 4/1964 | Brenzen | 200/157 |
| 3,662,136 | 5/1972 | Bienwald | 200/157 |
| 3,793,727 | 2/1974 | Moore | 83/DIG. 1 |
| 3,908,108 | 9/1975 | Hults | 200/157 |

FOREIGN PATENT DOCUMENTS

| | | |
|---|---|---|
| 2450577 | 5/1976 | Fed. Rep. of Germany ...... 200/157 |
| 887304 | 11/1943 | France . |
| 2072259 | 9/1971 | France . |
| 924225 | 4/1963 | United Kingdom . |
| 1356663 | 6/1974 | United Kingdom . |

*Primary Examiner*—James G. Smith
*Assistant Examiner*—K. Bradford Adolphson
*Attorney, Agent, or Firm*—Walter Ottesen; Ronald B. Sherer; Edward D. Murphy

[57] ABSTRACT

An alternate switch actuating mechanism for an electric drill or similar tool which permits the tool to be used in either a portable or stationary operation. The tool has a first handle that includes a first switch actuator for operating the tool and a second detachable handle which carries a second actuator for the switch. The second actuator is constructed so as to directly engage the first actuator to permit simplicity of operation and ease of disassembly for stationary operation. A lock is provided for precluding accidental actuation of the second actuator. The device also includes a reversing switch and an interlock which prevents actuation of the reversing switch when the drill is energized.

7 Claims, 5 Drawing Figures

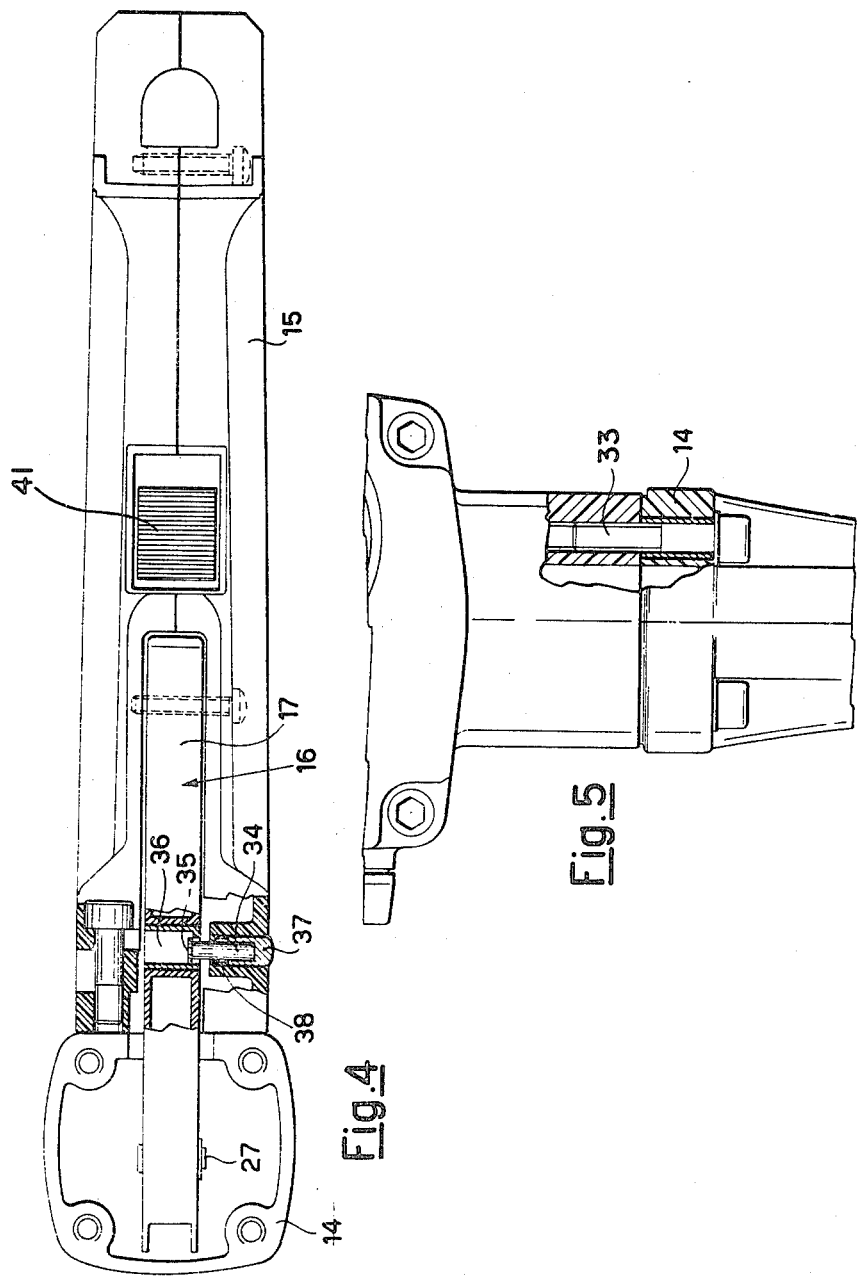

PORTABLE ELECTRIC TOOL

BACKGROUND OF THE INVENTION

This invention relates to a portable electric tool, and more particularly to an improved alternate switch actuating mechanism for such tool.

Many large size portable electric tools are also adapted for use in stationary applications. For example, large electric drills, hammer drills and the like, are provided with detachable handles to assist an operator in their hand held operation. In addition, when the handles are detached, the drill motor may be mounted in a drill stand so as to function as a drill press. For ease of operation when being hand held, it is desirable to provide an acuator for switching the drill on and off in one of the detachable handles. If this is done, however, it is necessary to provide some alternate switching arrangement for use when the drill is being used with the handles removed. Such an alternate switching arrangement should be constructed in such a way as to permit ease of assembly and disassembly, and also to minimize the number of moving parts so as to reduce costs and simplify assembly and reduce the likelihood of operating failures.

It is therefore a principal object of this invention to provide an alternate switching actuating mechanism for an electric power tool such as a drill, hammer drill, or the like.

It is another object of this invention to provide a portable electric drill with a single switch which may be actuated by means of a handle mounted actuator or by means of an actuator carried by a detachable handle.

Many electric tools such as electric drill and hammer drills incorporate a reversing mechanism so that the drill chuck may be driven in either of two directions. If, however, the reversing mechanism is inadvertently actuated while the drill is in operation, damage to the tool may result. If is, therefore, a further object of this invention to provide a tool of the aforenoted type wherein inadvertent reversal is precluded during operation of the motor.

SUMMARY OF THE INVENTION

This invention is adapted to be embodied in a switch actuating arrangement for a portable electric drill, hammer drill, or hammer, which has a housing, a first handle arranged on the housing, a electric switch for energizing the drill and an elongated handle detachably mounted to the housing. In accordance with the invention, a first lever is operatively connected to the switch and pivotally mounted on the drill for movement between the first and second positions corresponding to the on an off conditions of the switch. A second lever is pivotally mounted by the elongated, detachable handle and has an engaging portion which is positioned to directly engage and act upon the first lever when the elongated handle is attached to the housing for moving the first lever from its first position to its second position in response to pivotal movement of the second lever. The second lever is pivotally mounted within the elongated handle transversely to the first lever, and the first lever has its fulcrum between first and second portions thereof.

BRIEF DESCRIPTION OF THE DRAWINGS

FIG. 4 is a cross-sectional view taken generally along the line IV—IV but showing the mechanism for maintaining the drill in its energized condition.

FIG. 5 is an end elevational view, with a portion broken away, showing the manner of connection of the detachable handle to the drill.

DETAILED DESCRIPTION OF THE PREFERRED EMBODIMENT

Figure 1:
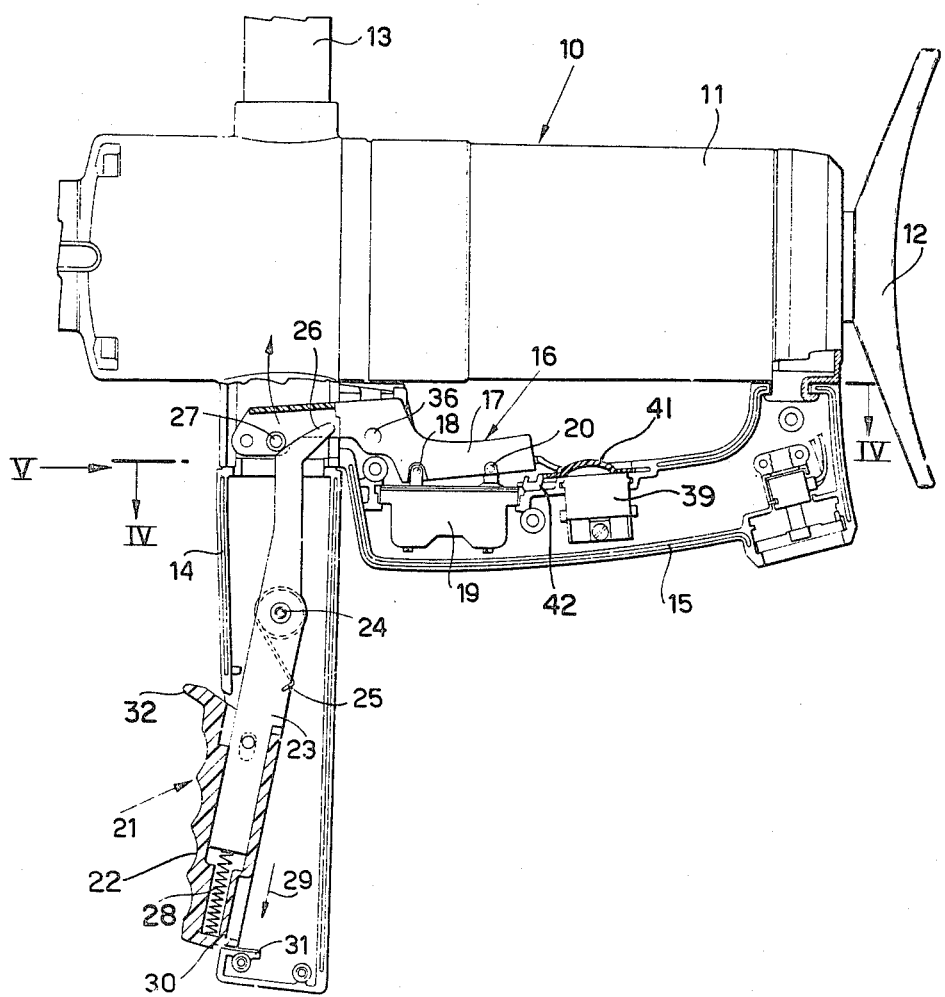
FIG. 1 is a partial top plan view, with portions broken away, of a heavy duty drill embodying the invention and showing the mechanism when the drill is not energized.

Referring in detail to the drawings, the reference numeral 10 illustrates generally a portable electric tool that is particularly adapted for use in stationary locations under certain conditions. The tool in the illustrated embodiment is of the large size, chest type electric drill or electric hammer drill which is adapted to be used either as a portable drill motor or as a stationary drill press through association with a drill stand.

The drill 10 includes a main housing 11 in which an electric motor and gear train are provided for driving the associated chuck (not shown). The rear end of the housing 11 is provided with a chest brace 12 against which the operator may bear when the drill is used in a portable fashion. To assist in the portable operation, removable handles 13 and 14 are attached to the opposite sides of the housing 11.

In addition to the removable handles 13 and 14, the housing 11 is provided with a permanently attached handle 15 which extends longitudinally relative to the housing 11, and which carries a main or first actuator 16. The actuator 16 consists of a lever 17 that is mounted intermediate its ends for pivotal movement about a pivot point 18, which is provided as a component of a main power switch 19. The switch 19 is suitably enclosed within the handle 15. An operator may place his hand within the opening provided by the handle 15 and squeeze the lever 17 for pivoting it in a clockwise direction about the pivot point 18 so as to actuate a contact 20 of the switch 19 and energize the drill 10. Preferably the lever 17 is spring biased in a known manner toward its released or "off" position when pressure is not applied to the lever 17 by an operator.

In order to permit operation of the drill 11 when the handles 13 and 14 are attached in a more convenient manner, a second actuator, indicated generally by the reference numeral 21, is carried by the detachable handle 14. As will become apparent, the second actuator 21 is constructed so as to permit direct actuation of the first actuator 16 by means of the second actuator 21 and yet to permit easy removal of the handle 14 without requiring any separate disconnection between the two actuators 16 and 21.

The second actuator 21 includes a hand grip portion 22 that is slideably supported on the outer end of a lever 23. The lever 23 is pivotally supported within the hollow interior of the handle 14 upon a pivot pin 24. The torsional spring 25 normally biases the lever 23 in a clockwise direction to a position which corresponds to the "off" or non-energized condition of the drill 10. In this "off" position, the hand grip portion 22 of the actuator 21 extends outwardly through an opening formed in the forwardmost side of the detachable handle 14.

The actuator 21, and specifically the lever 23, has a cam portion 26 which extends through the open end of the handle 14 which is attached to the housing 11. The cam portion 26 is adapted to co-act with a roller follower pin 27, which is carried by the actuator 16 and which specifically extends between a pair of downwardly extending legs of the lever 17. The adjacent portion of the lever 17 has a generally inverted "U" shape into which the cam portion 26 of the actuator 21 extends when the handle 14 is assembled to the housing 11.

A locking arrangement is incorporated in the actuator 21 for preventing inadvertent operation of the motor of the drill 10 in the event an operator accidentally grasps the hand grip 22. For this purpose the hand grip 22 is normally biased to a locking position by means of a spring 28 which is disposed between the lower end of the lever 23 and an interior bore formed in the lower end of the hand grip 22. The spring 28 biases the hand grip 22 in the direction of the arrow 29. The lower end of the hand grip 22 is formed with a notch or recess 30 which cooperates with a shoulder 31 formed by the handle 14 adjacent the lower end of the opening through which the hand grip 22 extends. Thus, when the actuator 21 is in the position shown in FIG. 1, the accidental application of pressure to the hand grip 22 will not result in pivotal movement of the lever 23 to actuate the switch 19 due to the detent operation of recess 30 and shoulder 31.

The hand grip 22 is provided with a forwardly extending projection 32 adjacent its uppermost end which affords a reaction surface through which an operator may move the hand grip 22 upwardly against the action of the spring 28 in a direction opposite the arrow 29 so that the recess 30 will clear the shoulder 31. The actuator 21 then may be pivoted in a counterclockwise direction about the pivot pin 24 to the position shown in FIG. 2. The cam portion 26 of the lever 23 will then engage the follower 27 and pivot the lever 17 to its "on" position in a clockwise direction about its pivotal support 18.

The handle 14, as has been noted, is detachably affixed to the housing 11 with the lever cam portion 26 extending through an opening formed in a boss of the housing 11 into which the portion of the lever 17 carrying the follower pin 27 extends. The handle 14 is affixed to this boss by means of screws 33 (FIG. 5). The handle 13 is also detachably connected to the housing 11, as has been noted, in any known manner. For example, the handle 13 may be screwed into a similar boss formed on the opposite side of the housing 11.

Figure 3:
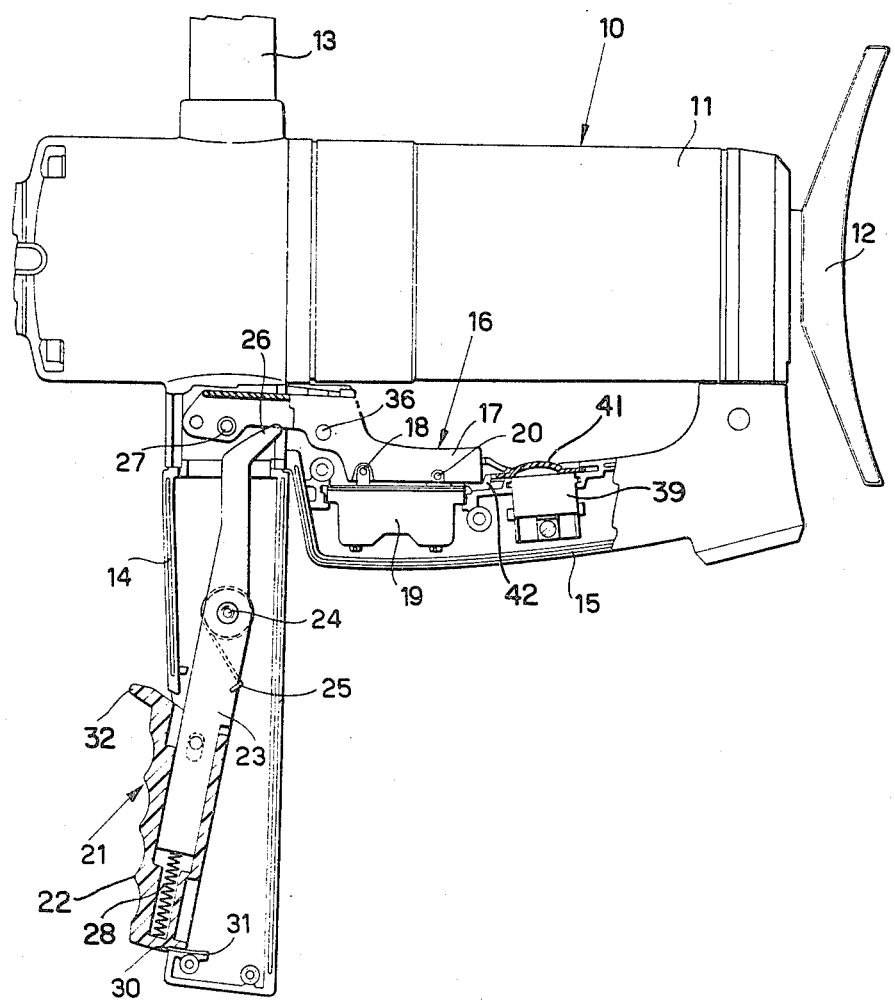
FIG. 3 is a top plan view, in part similar to FIGS. 1 and 2, showing the drill in its energized condition when switched on by the actuator associated with the permanent handle.

The connection between the actuators 21 and 16 is such that the actuator 16 may be used without interference from the actuator 21 even when the handle 14 is attached. This condition is shown in FIG. 3. It is believed to be readily obvious that the actuator 16 may be operated by pivoting the lever 17 about its pivot point 18 so as to actuate the contact 20 of the switch 19. A follower pin 27 merely moves away from and independently of the cam surface 26 under this operating condition.

An arrangement is also incorporated for locking the drill 18 in its "on" condition without requiring continued pressure by the operator on either the actuator 21 or the actuator 16. This device consists of a pin 34 that is slidably supported in the handle 15 and which has a head 35 that is adapted to enter into an opening 36 formed in the lever 17, when the lever 17 is in its "on" position. This registry is permitted regardless of which of the actuators 16 or 21 has been operated. The pin 34 has an actuator portion 37 which can be depressed by the operator to bring the head 35 into registry with the opening 36. The operator can then release either of the actuators 16 of 21 and the frictional engagement by the head 35 and the lever 17 will result in retention of the pin 34 to lock the drill 10 in its "on" condition. If the actuator 21 was used to energize the drill 10, the hand grip portion 22 may be released by the operator, if desired, so that it could return to the position shown in FIG. 3 under the action of the springs 25 and 28.

To release the pin 34, sufficient pressure is applied to either actuator 16 or 21 so as to release the frictional engagement between the head 35 and the opening 36 so that a return spring 38 can urge the pin 34 to its released condition.

The drill 10 is additionally provided with a reversing switch 39 whereby the direction of rotation of its motor and the associated chuck may be reversed. The reversing switch 39 is positioned within the handle 15 adjacent the on/off switch 19. The handle 15 has an opening in the face adjacent the hand opening through which a slide actuator 41 of the reversing switch 39 extends. The slide actuator 41 carries a "V" shaped lock 42 at its forward end which cooperates with the actuator 16 for precluding reversal of the direction of the rotation of the drill motor when it is in operation, thereby insuring against possible damage to the equipment.

Figure 2:
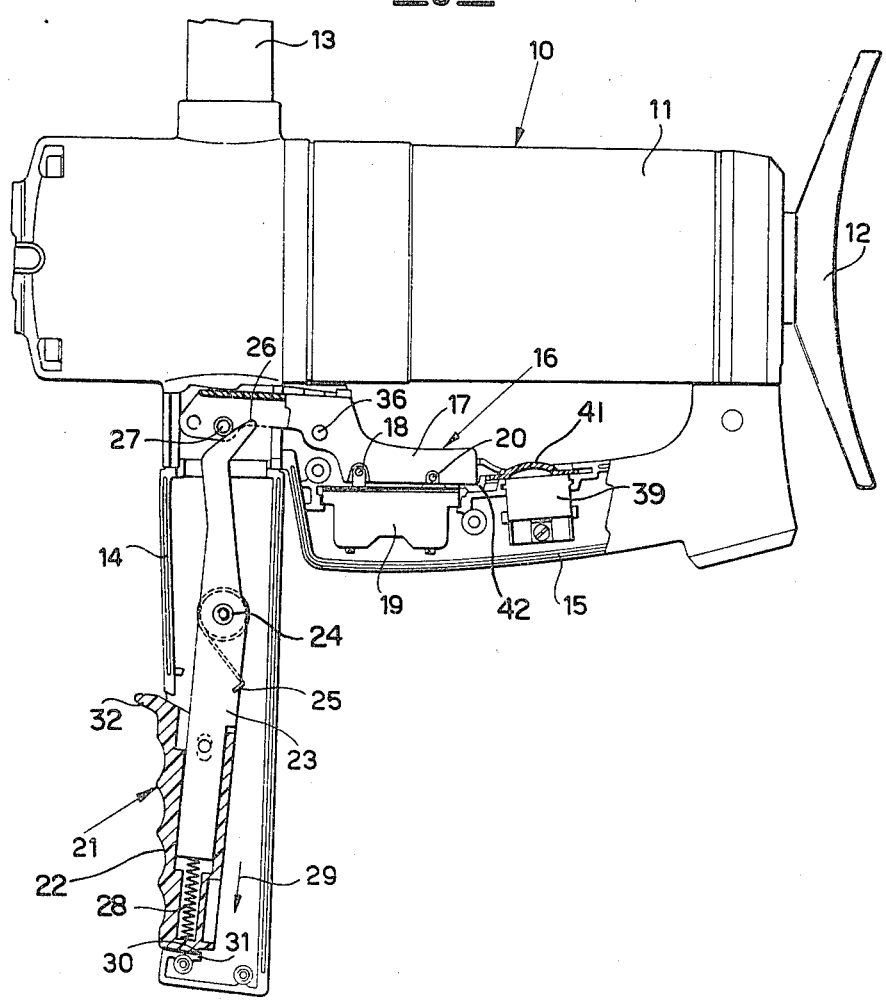
FIG. 2 is a top plan view, in part similar to FIG. 1, showing the drill in an energized condition when switched on by means of the actuator associated with the removable handle.

The portion of the lever 17 on the side of the pivot 18 adjacent the reversing switch 39 also has a generally inverted "U" shape. A rear wall of the lever 17 closing this "U" shape is adapted to coact with the lock 42 so as to prevent this accidental reversal. FIGS. 1 through 3 show the reversing switch 39 in one of its positions which may be assumed to be the position the switch actuator 41 is in when the motor of the drill 10 is rotating in a forward direction. When the motor is switched on through operation of either of the actuators 16 or 21, the rear wall of the lever 17 will move into registry with the bight of the lock 42. This position and condition is clearly shown in FIGS. 2 and 3. As such, the reversing switch 39 may not be actuated to its reverse position since the switch actuator 41 cannot be slid to this position.

When the drill 10 is again switched off, the lever 17, and specifically its rear wall, will move free of its engagement with the bight of the lock 42. The direction of rotation of the motor of the drill 10 may then be reversed by sliding the actuator 41 rearwardly. In the reverse position, the forward edge of the lock 42 will be disposed closely adjacent the rear wall of the lever 17. If the drill 11 is energized through operation of either of the actuators 16 or 21, this rear wall will then move into registry with the forwardmost edge of the lock 42. This will effectively block the reversing switch actuator 42 from being slid back to its forward rotation position.

It should be readily apparent from the foregoing description that this invention provides a relatively simple and uncomplicated arrangement whereby a drill motor may be operated by either of two actuators, one of which is associated with a removable handle. Removal of the handle and its associated actuator is relatively simple and does not require any separate disconnection of the operative connection between the two actuators. The arrangement is also extremely simple in that the removable actuator directly operates upon the permanent actuator without necessitating any interconnecting linkage or members which could interfere with the operation of the device. Furthermore, a simple and yet highly effective arrangement is incorporated that prevents inadvertent reversal of the direction of rotation of the motor when the device is in operation. Although a preferred embodiment of the invention has been illustrated and described, it is to be understood that the invention is susceptible to modification and changes from the preferred embodiment by those skilled in the art without departing from its spirit and scope, as defined by the appended claims.

I claim:

1. In a portable electric drill, hammer drill or hammer having a housing, a first handle arranged on the housing, an electric switch for energizing the drill, a second elongated handle detachably mounted to the housing, and an arrangement for actuating the switch, the arrangement comprising:

a first lever mounted in said first handle to act on said switch, said first lever having a first portion directly engaging said switch and being pivotally mounted on the first handle for movement between first and second positions corresponding to the off and on conditions of the switch;

a second lever mounted on said second elongated handle transversely to said first lever, said second lever having an engaging portion positioned to directly engage said first lever;

said first lever having a second portion to engage said engaging portion of said second lever, said first and second portions of said first lever being spaced from each other with the fulcrum of said first lever therebetween;

said second lever being pivotally mounted within said second elongated handle whereby said engaging portion acts upon said first lever to cause the latter to move from said first position to said second position in response to a pivotal movement of said second lever;

said elongate handle having an opening therein through which an end portion of said second lever projects when said second lever is in its disengaged position for actuation by the hand of an operator;

a hand grip slidably supported on said projecting end portion for operation of said second lever by the operator;

biasing means for biasing said hand grip in an extended position; and said hand grip and said elongated handle having cooperating detent means when said hand grip is in its extended position for precluding accidental actuation of said second lever, said hand grip being slidable relative to said second lever in opposition to the actuation of said biasing means for freeing said detent means from engagement with each other whereby said second lever may be actuated.

2. A portable electric drill, hammer drill or hammer as set forth in claim 1 wherein the operative connection between the second lever engaging portion and the first lever is such that removal of the elongated handle will disconnect the operative connection without further action.

3. A portable electric drill, hammer drill or hammer as set forth in claim 2 wherein the elongated handle has a second opening in registry with an opening in the drill housing when said elongated handle is connected thereto, the second lever engaging portion extending through said second opening for engagement with said second portion of the first lever, said opening through which said end portion projects facing in a forward direction when said elongated handle is attached to said drill housing.

4. A portable electric drill, hammer drill or hammer as set forth in claim 1, further including a reversing switch for reversing the direction of rotation of the drill and interlock means for precluding actuation of said reversing switch when said drill is energized.

5. A portable electric drill, hammer drill or hammer as set forth in claim 4 wherein the interlock means cooperates with the first lever when said first lever is in its second position for precluding actuation of the reversing switch.

6. A portable electric drill, hammer drill or hammer as set forth in claim 5 wherein the reversing switch has an actuator, the interlock means including an element carried by said reversing switch actuator and having a first portion adapted to cooperate with a surface of the first lever for precluding movement of said reversing switch actuator when said reversing switch is in a first of its positions, said element having a second portion adapted to cooperate with said surface of said first lever when the reversing switch is in the other of its positions for precluding movement of said reversing switch actuator.

7. A portable electric drill, hammer drill or hammer as set forth in claim 6 wherein the elongated handle has a second opening in registry with an opening in the drill housing when said elongated handle is connected thereto, the second lever engaging portion extending through said second opening for engagement with said second portion of the first lever.

* * * * *